United States Patent [19]

Yoshida et al.

[11] 4,061,172

[45] Dec. 6, 1977

[54] ASSEMBLY OF PNEUMATIC TIRE AND RIM

[75] Inventors: Akira Yoshida, Itami; Taketoshi Kubo, Nara; Mashayuki Yamajo, Izumi; Masahiro Ishigaki, Ibaragi, all of Japan

[73] Assignee: The Toyo Rubber Industry Co., Ltd., Osaka, Japan

[21] Appl. No.: 665,481

[22] Filed: Mar. 10, 1976

Related U.S. Application Data

[63] Continuation of Ser. No. 523,949, Nov. 14, 1974, abandoned.

[30] Foreign Application Priority Data

Nov. 14, 1973  Japan .............................. 48-128059

[51] Int. Cl.² ................. B60C 15/02; B60C 13/00
[52] U.S. Cl. ..................... 152/379.1; 152/352 A; 152/353 R; 152/362 R
[58] Field of Search ................... 152/352, 353 R, 354, 152/362 R, 362 CS, 379, 330 RF

[56] References Cited

U.S. PATENT DOCUMENTS

| | | |
|---|---|---|
| 2,037,640 | 4/1936 | MacMillan ...................... 152/362 R |
| 2,874,745 | 2/1959 | Wann ............................... 152/353 R |
| 2,947,342 | 8/1960 | Holloway ....................... 152/362 CS |
| 3,419,061 | 12/1968 | Morikawa et al. ............. 152/362 CS |
| 3,631,913 | 1/1972 | Boileau ........................... 152/353 R |

Primary Examiner—Drayton E. Hoffman
Attorney, Agent, or Firm—Sughrue, Rothwell, Mion, Zinn and Macpeak

[57] ABSTRACT

An assembly of a pneumatic tire and a wheel rim in which the tire is provided unitedly with at least one ring-formed projection area to the outside of the rolling axis direction of the tire and adjacent the rim flange, whereby safety and durability are maintained without causing the bead areas to separate from the rim when the tire is "run flat." The projection area is disposed and formed adjacent the rim flange at a specified diameter difference, and the bead area inward of the tire is formed at a specified inclination. Further, the projection area is reinforced circumferentially with a reinforcing material and has a rigid part comprising a high modulus rubber compound.

4 Claims, 5 Drawing Figures

ASSEMBLY OF PNEUMATIC TIRE AND RIM

This is a continuation, of application Ser. No. 523,949, filed Nov. 14, 1974, now abandoned.

BACKGROUND OF THE INVENTION

1. Field of the Invention

This invention relates to an improved assembly of a pneumatic tire and a wheel rim, and has as its particular object to provide an assembly which is free of the disadvantage in which the bead areas separate from the bead seat of the rim both when the inner air pressure of the tire is decreased and when the tire is punctured and which also has good safety and durability.

2. Description of the Prior Art

Pneumatic tires (hereinafter simply referred to as "tires" in this specification), for example, passenger car tires, have ordinarily an inner air pressure of about 1.5 to 2.0 kg/cm$^2$. When the car is running under a condition of a reduced inner air pressure of the tire of 0.5 to 1.0 kg/cm$^2$ and the vehicle makes a sudden and rapid turn, the bead areas of the tire tend to separate from the bead seat of the rim, which leads to not only a failure of the tire, but also to an unstable running of the vehicle and as a result, the running vehicle becomes dangerous.

Particularly when the tire is punctured, whether the running vehicle is suddenly and rapidly turned or is driven straight, the tire separates from the rim and control of the vehicle is lost. As a consequence, an accident which can cause death and injury often happens. When the tire separates from the rim, the vehicle runs with the rim in contact with the road surface, ultimately, so that the rim and road surface are damaged and the tire breaks down while the driving of the vehicle becomes extremely unstable. Thus, tragic traffic accidents result.

In view of these circumstances, various safety tires have been heretofore proposed which exhibit high safety preformance when the inner air pressure of the tires is reduced or the tires are punctured, that is to say, when the tires are in a so-called "run flat" condition. Examples of these safety tires include (1) a tire in which a spacer is interposed between a pair of beads facing one another, thereby fixing the bead areas so that the bead areas do not separate from the bead seat of a rim; (2) a tire in which plurality of air chambers are formed by inserting an inner tire inside an outer tire; (3) a structure in which a tire is mounted on a rim, and a bolt is set on the rim to prevent separation of the bead areas from the rim; and others.

The tires or structures as proposed above, however, have not yet been widely used in practice because of the following numerous drawbacks:

Namely, in the tire as described in (1) above, in which a spacer is interposed between a pair of beads, the cost of the tire is increased since the spacer interposed between the beads comprises a metal or a rubber and fiber and further, when the tire is practically mounted on a rim many difficulties are encountered. On the other hand, in the tire as described in (2) above, in which a plurality of air chambers are formed by inserting an inner tire inside an outer tire, the manufacture of the inner tire to be inserted inside the outer tire requires almost the same processing stages as those of manufacture of the outer tire, the resulting structure is naturally complicated and an air valve for the multi-chambered tire must also be employed, which leads to increases in costs. These tires have not been practically and widely used due to the restrictions above. Further, the tire as described in (3) above, in which a tire mounted on a rim and bolted, problems in respect to safety and durability of the rim still persist since the rim is set with a bolt.

In addition to the tires described above, an assembly of a tire and a rim has also been proposed in which the bead areas of the tire and the rim are integrally united, but this assembly also has drawbacks in that the usual methods for manufacture of tires and usual specifications with respect to the rim must be changed greatly and it is impossible to mount and demount the tire, e.g., for changing the tire.

Thus, it can be seen that although various improvements have been proposed hitherto, many obstacles exist in these prior proposed constructions from a practical viewpoint.

SUMMARY OF THE INVENTION

According to this invention, an assembly of a tire and a rim in which separation of the bead areas from the bead seat of the rim (hereinafter simply referred to as "separation" in this specification) can be prevented by means of a construction where a transverse deformation in a region extending from the bead areas to the lower sidewalls is limited, in order to prevent a reduction in the resisting force against separation inwardly in the transverse direction of the tire in the neighborhood of the bead areas with a decrease of the inner air pressure of the tire when the inner air pressure is reduced or the tire is punctured.

DETAILED DESCRIPTION OF THE INVENTION

This invention will be hereinafter described by way of example with reference to the accompanyng drawings.

Figure 1:
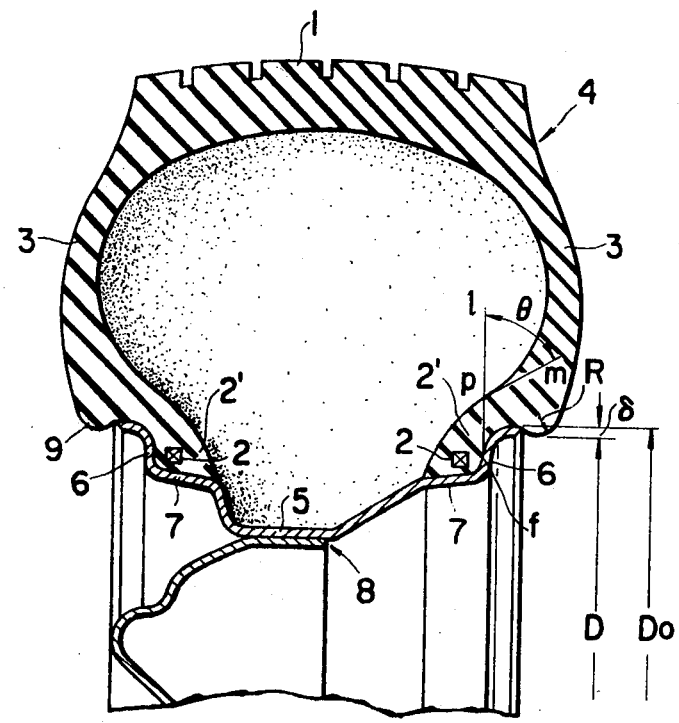
FIG. 1 is a radial sectional view of an assembly showing one example of this invention.

Now referring to FIG. 1, an assembly of a pneumatic tire 4 comprising a pair of bead wires 2, 2, a tread portion 1 located between the beads and a pair of sidewalls extending from the tread to the beads; and of a rim 8 comprising a wheel rim base area 5, rim flanges 6, 6 and a pair of bead seats 7, 7 extending from the rim base to the rim flanges in the direction of the rim axis, and with the tire 4 being provided with ringformed projection areas 9, 9 protruding outwardly of the tire in a region adjacent the rim flanges 6, 6.

In accordance with one feature of this invention, the ring-formed projections 9, 9 are moulded and vulcanized with the tire 4 and united thereto and here, a minimal diameter D of the ring-formed projections must be chosen so that the value ($\delta$) of the half difference between the minimal diameter D of the projections 9, 9 and the outer diameter $D_o$ of the rim flanges 6, 6 under conditions of an inner air pressure of zero and of no load ranges from about 2 to 7 mm. A preferred value ($\delta$) ranges from about 2 to 5 mm. When the value ($\delta$) exceeds about 7 mm, many difficulties are encountered in manufacturing processes of the tire and also in the work of mounting and demounting the tire on a rim of a tire, whereas when the value ($\delta$) is less than about 2 mm, the resisting force against separation is reduced that is to say, the effect of preventing separation becomes small.

The cross-sectional form of the ring-formed projections 9, 9 can be optionally chosen and varied if only the value $\delta$ is within the range specified above, and can be, for example, an arc-form or a form having greater than one linear portion part. For example, when the cross-sectional form is an arc, the radius of curvature (R) of the arc preferably ranges from about 4 to 30 mm.

By the assembly of the tire and rim thus constructed above, it is possible to maintain safety without reducing extremely the resisting force against separation even when the inner air pressure of the tire is reduced or the tire is punctured during running at ordinary speeds and straight running at high speeds.

In accordance with another feature of this invention, the ring-formed projection areas 9, 9 preferably have a high rigidity in the circumferential direction of the tire and accordingly, for this purpose the ring-formed projection areas can be reinforced with a plastic material such as a fiber-reinforced plastic or a metal such as steel wire by embedding the reinforcing material in a ring form as a reinforcing core. Either a tire cord fabric comprising an organic or inorganic fiber can be incorporated in a layer form or cut fibers thereof can be mixed likewise for the reinforcement of the ring-formed projection areas. In the latter case, the cut fibers are preferably oriented in the circumferential direction of the tire. As another means of reinforcement, a chafer can be disposed in a region extending from the heel part of the bead areas to the ring-formed projection areas 9, 9 and a chafer of steel cords is preferred as such. Additionally or alternatively, the ringformed projection areas 9, 9 can have a rigid portion of a rubber material and a suitable material is a rubber compound having a 100% modulus of elasticity of about 30 to 70 kg/cm$^2$, more preferably 30 to 60 kg/cm$^2$.

As a matter of course, the foregoing means can be appropriately combined for the purpose of reinforcing the ringformed projection areas.

The reinforcement as such in the ring-formed projection areas 9, 9 even more markedly affect the resistance to separation when the tire is in a "run flat" condition, so that it is possible to maintain safety both when a vehicle is suddenly and rapidly turned and when the tire is running at a high speed.

In general, when a pair of the bead areas in a tire running under a load deviate somewhat from the center line of the tire tread portion (1) contacting the ground, a force acts to displace the bead areas 2', 2' inwardly of the rolling axis direction of the tire and as a result, the outward bead area particularly being inward of the rolling axis direction of the tire separates from the bead seats 7, 7 of the rim. The lower the inner air pressure of the tire is reduced and the smaller is the turning radius of the tire and the more rapid is the turning, the greater the displacement by this force becomes. Ultimately, the displacement becomes so great that the bead areas 2', 2' separate from the bead seats 7, 7 of the rim and as a consequence, the running of the vehicle is endangered.

To the contrary, in accordance with the construction of the tire and rim pertaining to this invention, the resisting force against separation is greater even though the above-described force displacing the bead areas inwardly of the rolling axis direction of the tire acts, so that the bead areas 2', 2' do not readily separate from the bead seats 7, 7 of the rim.

In accordance with a further feature of the invention, the bead areas 2', 2' in the neighborhood of the ring-formed projection areas 9, 9 of the tire are moulded in such a manner that the angle $\theta$ made between an extension line $l$ of the bead areas 2', 2' aligned with a radially straight line part $f$ of the rim flanges 6, 6 and a tangent line $m$ in a radially outward direction of the tire at a crossing point $p$ of the extension line $l$ and an inside face of the tire in the bead areas 2', 2' ranges from about 45° to 90°. The preferred angle $\theta$ ranges from 45° to 70°.

Figure 2:
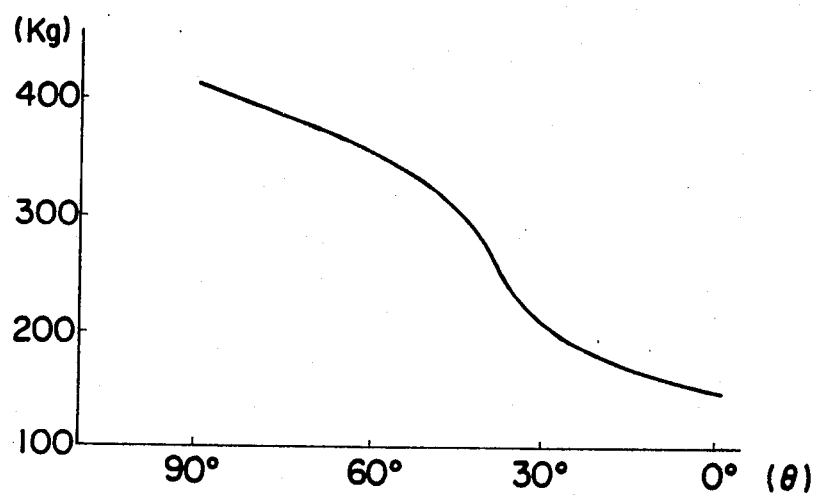
FIG. 2 shows the relationship between a resisting force to bead unseating (kg) and an angle ($\theta$) as hereinafter defined.

FIG. 2 shows the results of tests carried out according to BEAD UNSEATING TEST PROCEDURE stipulated in FMVSS-109-S5.2 on a tire without the ring-formed projections (size: 185/70 HR 13), in which the $\theta$ angle was varied from 0° to 90°.

As will be apparent from the results in FIG. 2, when the above-described angle $\theta$ is less than 45°, the resisting force to bead unseating kg is sharply reduced. Under this condition, the bead areas of the assembly of the tire/rim are displaced greatly and accordingly, the running vehicle cannot be maintained safely and danger can occur. On the other hand, when the above-described angle $\theta$ ranges from about 45° to 90°, the resisting force to bead unseating kg is high and accordingly, the bead areas are displaced only slightly and substantially no separation of the bead seat of the rim occurs. It is, thus, possible for safety and durability of the running tire to be maintained. However, when the above-described angle $\theta$ exceeds about 90°, it is very difficult to manufacture a tire because tension applied to the carcass plies becomes non-homogeneous during the vulcanizing process. Therefore, the angle $\theta$ should be selected to range from about 45° to 90°.

As described above, the ring-formed projections 9, 9 are moulded and vulcanized and thus united to the tire at the specified part in such a manner that under the conditions of a zero inner air pressure and no load, the value $\delta$ of the half difference between the minimal diameter D of the projections and the outer diameter $D_o$ of the rim flanges 6, 6 ranges from about 2 to 7 mm. The greater the value $\delta$, the greater the resisting force against separation when the inner air pressure of the tire is reduced or the tire is punctured. Further, the greater is the rigidity of the ring-formed projections 9, 9, the more the resisting force against separation is increased. When in a tire having the ring-formed projection areas 9, 9 within the specified range of the value $\delta$ of about 2 to 7 mm, the inner air pressure of the tire is reduced under a load, the projection areas are subjected to compression and the value $\delta$ naturally becomes high. Consequently, the resisting force against separation increases, so that separation of the bead areas from the rim is prevented. This effect or function is due essentially to the ring-formed projections themselves. Even if the tire should be in a "run flat" condition because of a puncture, etc., during running, its safety and durability can be maintained due to the foregoing effect.

Figure 4:
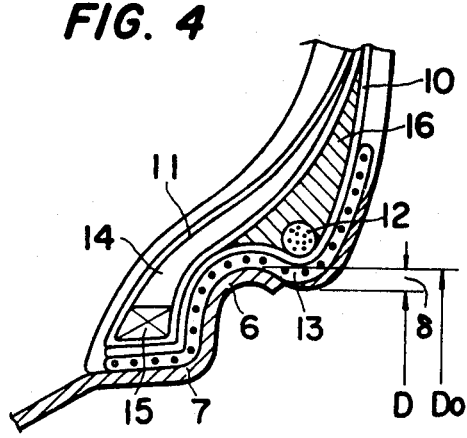
FIG. 4 and FIG. 5 are each a radial sectional view of another assembly of another example according to this invention partly illustrating the bead area and the neighborhood of the bead area.

In FIG. 4, Tire A is partly shown as one embodiment according to this invention. Referring to Tire A, the tire size is 185/70 HR 14; the above-described angle $\delta$ is 60°; the above-described value $\delta$ and the radius of curvature (R) of the ring-formed projection are 5 mm and 6 mm, respectively, and the projection area is disposed in a part of the tire adjacent the outside of the rim flange 6; and the tire is mounted on the rim 7. Radial carcasses 10, 11 are constructed so that they wrap around beads 15 and further wrap around the opposite beads extending from a bead area 14 through a sidewall and a tread, with the outer radial carcass 10 wrapping also reinforcing cores 12 embedded in the ring-formed projections. The reinforcing cores 12 comprise 20 steel cords $\theta$ mm of a high elongation type having a size of 3 $\times$ 7 $\times$ 0.15. twisted together. Outside the outer radial carcass 10, a steel cord chafer 13 (1 $\times$ 4 $\times$ 0.22 mm; 20 end counts/inch) is disposed extending from the ring-formed projection area to the heel part of the bead area 14. A rubber compound having a 100% modulus of elasticity of 60 kg/cm$^2$ is used for a rigid part 16 in order to further impart high rigidity to the ring-formed projection area.

Figure 5:
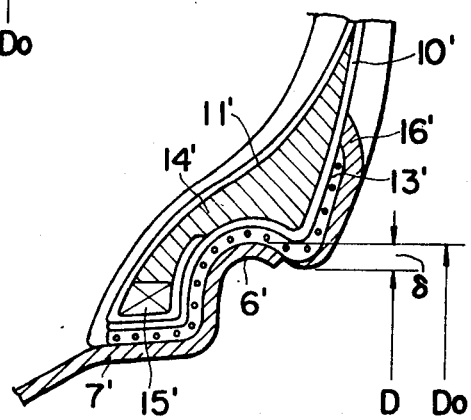

FIG. 5 similarly shows Tire B of another embodiment according to this invention, in which the tire size, the abovedescribed angle $\theta$, value $\delta$ and radius of curvature R are the same as those of Tire A shown in FIG. 4 and the ring-formed projection area is disposed outward of the tire adjacent a rim flange 6', and this tire is mounted on a rim 7'. Tire beads 15' are wrapped around by an outer radial carcass 10' and an inner radial carcass 11', with both the carcasses extending therefrom to the opposite bead. The ring-formed projection area is disposed outside the outer radial carcass 10' and outward the rolling axis of the tire adjacent the rim flange 6', and in a rigid part 16' thereof, a rubber compound having a 100% modulus of elasticity of 60 kg/cm$^2$ is used. Between the rigid part and the outer carcass 10', a steel cord chafer 13' (1 $\times$ 4 $\times$ 0.25 mm; 20 end counts/inch; the cord angle of 20° with respect to the circumferential direction of the tire) is interposed extending to the heel part of the bead area. A rubber compound of a high rigidity (100% modulus of elasticity of 60 kg/cm$^2$) is embedded in a region 14' surrounded by the inner carcass 11' and extending from the bead area to the ring-formed projection area.

Figure 3:
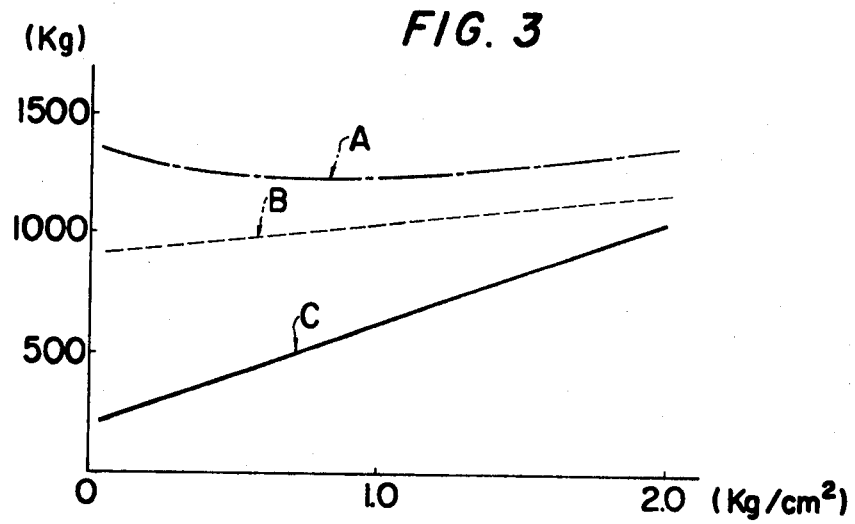
FIG. 3 shows comparative test results of tires according to this invention and a conventional tire with respect to the relationship between the resisting force to bead unseating (kg) and the inner air pressure of tire (kg/cm$^2$).

FIG. 3 shows the relations between the inner air pressure and the resisting force to bead unseating (kg) with Tire A and Tire B both according to the invention and a conventional tire, Tire C. Here, Tire A and Tire B are tires of constructions as illustrated in FIG. 4 and FIG. 5, respectively, while Tire C has a size of 185/70 HR 14 and an angle $\theta$ as defined above of 40°. Tests were performed according to FMVSS-109-S5.2 (BEAD UNSEATING TEST PROCEDURE) with these tires. As can be seen from the test results, with regard to the conventional tire (Tire C) the resisting force to bead unseating (kg) is reduced sharply with a decrease in the inner air pressure, which indicates that the bead areas of this tire tend to separate readily from the bead seat of a rim.

In general, as the inner air pressure of a tire decreases, the side force when a car turns is decreased gradually and a force causing the bead areas to separate from the bead seat of a rim also gradually decreases, whereas the resisting force to bead unseating (kg) is reduced sharply nevertheless as shown in the case of the conventional tire in FIG. 3.

In contradistinction to this, with Tire A and Tire B, both according to this invention, the resisting forces to bead unseating (kg) decrease slightly or rather increase to some extent particularly in case of Tire A, even though their inner air pressures are reduced. Tire A and Tire B have thus markedly and clearly distinct resisting forces to bead unseating (kg) from Tire C and the bead areas of both are very difficult to separate from the rim.

In the assembly of the tire/rim according to this invention, since a characteristic improvement is made with the tire in the outer and inner areas of the region adjacent the rim flange, greatly differing from conventional tires, the cornering force of the tire when "run flat" considerably increases as compared with conventional tires since the transverse movement inside and outside the sidewalls is made small and the resisting force against separation is great. Accordingly, the assembly of the tire/rim constructed according to this invention makes the safe running of a vehicle possible without causing the bead areas to separate from the rim when the tire is under a "run flat" condition and therefore, this invention is expected to be widely utilized in the industry due to its practical usefulness. Further, for the manufacture of the tire to be applied in this invention only a small amount of alteration of a conventional process is needed, while a conventional rim itself can be used without the necessity of any changes. It is further to be noted that the assembly of the tire and the rim pertaining to this invention are not confined to passenger car use and the tire is not limited to a radial tire as shown in the embodiments.

While the invention has been described in detail and with reference to specific embodiments thereof, it will be apparent to one skilled in the art that various changes and modifications can be made therein without departing from the spirit and scope thereof.

What is claimed is:

1. In a pneumatic tire and wheel assembly comprising: a tire including a tread and a pair of sidewalls extending radially inwardly therefrom on each side thereof and terminating in bead areas and a wheel rim comprising: an axially directed rim base, bead seats extending axially from said rim base to each side thereof and terminating in radially outwardly directed rim flanges, the improvement wherein said pneumatic tire comprises at least one unitary ring-formed projection axially outside of the wheel rim and adjacent the rim flange and including a first portion projecting radially inwardly of said rim flange such that when the tire has an inner air pressure of 0 and is under no load, the half difference between the minimum diamter of the ring-formed projection at said first portion and the outer diameter of the rim flange ranges from about 2 to 7 mm, said tire ring-formed projection further including a second, rigid portion radially beyond said rim, said second portion comprising a rubber compound having a 100% modulus of elasticity of about 30 to 70 kg/cm$^2$, and wherein a reinforcing material extends in a circumferential direction of the tire and lies within said ring-formed projection, second rigid portion, at a position radially and axially outwards of said rim flange.

2. The assembly as claimed in claim 1, wherein said pneumatic tire is so constructed that the angle formed by an extension line of the bead areas aligned with a radially straight line portion of said rim flange and a tangent line in a radially outward direction at a crossing point of the extension line and the inside face of the tire in said bead areas ranges from about 45° to 90°.

3. The assembly as set forth in claim 1, in which said reinforcing material is at least one member selected from the group consisting of an oriented cut fiber, a bead wire, a cord chafer and a fiber-reinforced-plastic.

4. The assembly as claimed in claim 2, wherein said angle ranges from about 45° to 70°.

* * * * *